United States Patent [19]
Corbo et al.

[11] 4,149,477
[45] Apr. 17, 1979

[54] TEXTILE ELEMENT

[75] Inventors: Kenneth P. Corbo; Richard W. Shepard, both of Torrington; William A. Ross, New Hartford; Albert S. Ashmead, Torrington, all of Conn.

[73] Assignee: The Torrington Company, Torrington, Conn.

[21] Appl. No.: 812,743

[22] Filed: Jul. 5, 1977

Related U.S. Application Data

[63] Continuation-in-part of Ser. No. 727,446, Sep. 28, 1976, abandoned.

[51] Int. Cl.² .................. D05B 85/02; D04B 35/04
[52] U.S. Cl. .................................. 112/222; 66/121
[58] Field of Search ............. 66/116, 121, 122, 119, 66/125 B, 104; 112/222, 224, 223; 223/102, 103, 104; 163/5

[56] References Cited

U.S. PATENT DOCUMENTS

| | | | |
|---|---|---|---|
| 777,065 | 12/1904 | Boardman | 112/224 |
| 2,100,060 | 11/1937 | Piercy | 66/104 X |
| 2,539,859 | 1/1951 | Rainville | 112/224 |
| 2,596,311 | 5/1952 | Vitoux | 66/121 X |
| 3,004,733 | 10/1961 | Spivey | 66/125 B |
| 3,356,047 | 12/1967 | Short | 223/102 X |
| 3,444,704 | 5/1969 | Smith | 66/125 B |
| 3,753,412 | 8/1973 | Shepard et al. | 112/222 |
| 4,017,708 | 4/1977 | Engel et al. | 219/121 LM |

FOREIGN PATENT DOCUMENTS

| | | | |
|---|---|---|---|
| 1485382 | 9/1969 | Fed. Rep. of Germany | 112/222 |
| 1928241 | 12/1969 | Fed. Rep. of Germany | 66/121 |
| 290431 | 5/1928 | United Kingdom | 223/102 |

*Primary Examiner*—Wm. Carter Reynolds
*Attorney, Agent, or Firm*—Frank S. Troidl

[57] ABSTRACT

A hardened wear spot on a textile element is formed by applying high energy heat to a selected small area of the element which has been previously hardened and tempered to provide the proper spring characteristics for an operating textile element. The intensity and time of application of the high energy heat and the cooling after heat cut-off are carefully controlled to provide a small area of full hardness which is completely separated from the remaining tempered portion by a buffer zone of less hardness than either the tempered portion or the full hardness area.

The new textile element made by this new method is a textile element with the major portion having a predetermined spring characteristic for an operating textile element. A small area of full hardness is located at a predetermined location to provide wear resistance. A buffer zone having less hardness than either the full hardness area or the major tempered portion completely separates the full hardness area from the major portion.

1 Claim, 8 Drawing Figures

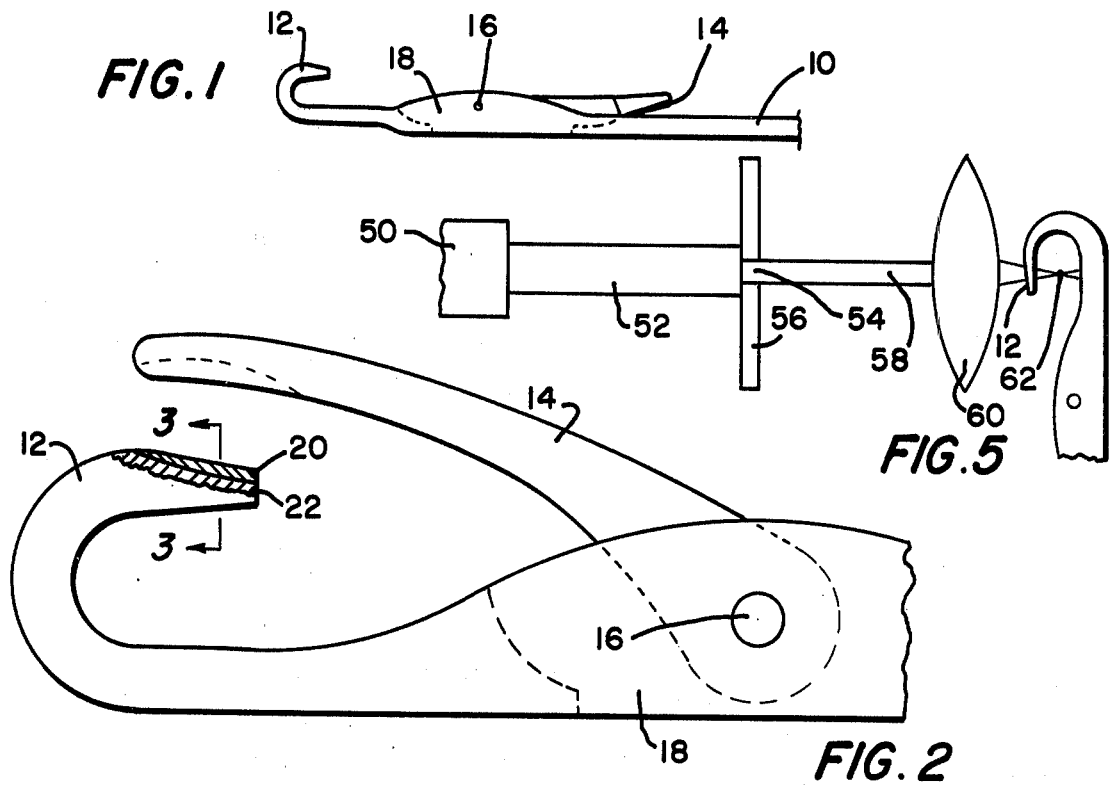

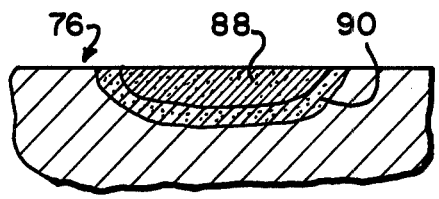
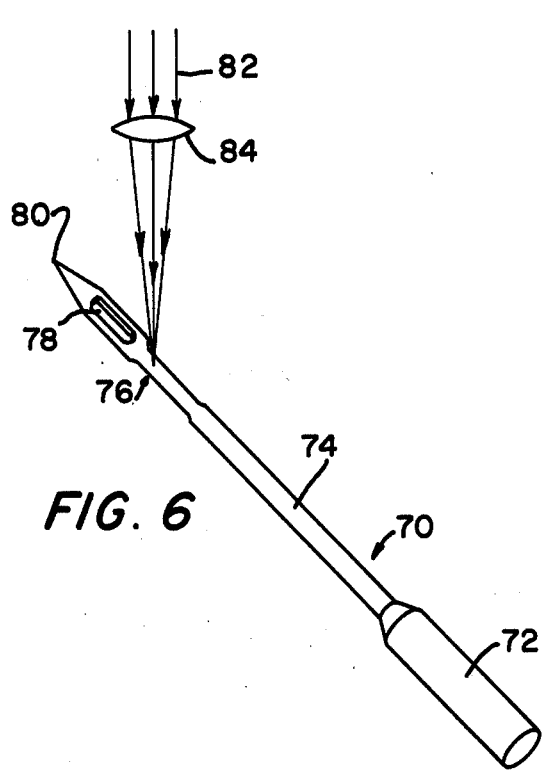
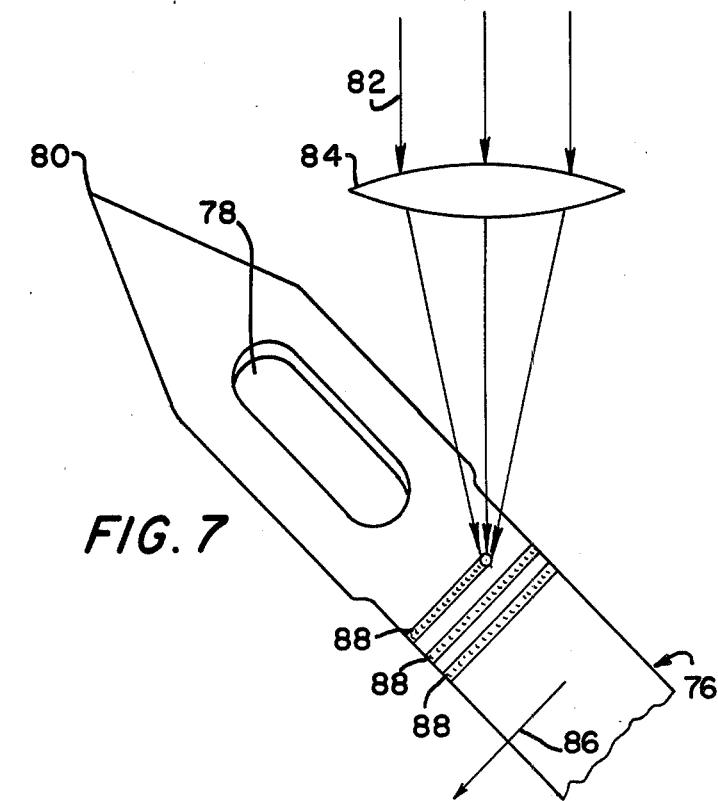

TEXTILE ELEMENT

This is a Continuation-In-Part of Application Ser. No. 727,446, filed Sept. 28, 1976 now abandoned.

This invention relates to textile elements. More particularly, this invention is a new textile element and a new method for making a textile element.

In the general usage of textile machine elements, it often happens that one or two spots on each element receive more wear than the remainder of the element. Examples are the points and eyes of sewing machine needles, the hooks of machine knitting needles, the spots of tufting needles, the barbs of felting needles, the points of awls, and the ends of punches.

Good textile element making practice requires that the hardness of a properly heat-treated element should be as great as the application of the part will allow. The textile element must have the utmost wear resistance while remaining spring-like enough to resist breakage. The metal used to make textile elements, such as steel, provides the best wear resistance when it is fully hardened. Unfortunately, these textile parts are always load-carrying elements, and therefore must act somewhat like springs capable of being continuously and repetitiously stressed without failing. Unfortunately, when the material is fully hardened, it is the most breakable. Such full hard parts are brittle, and except for a few rare applications, will not function long as textile elements. Excessive hardness can cause cracks during usage with eventual fatigue failures or even immediate breakage, particularly at any sharp surface discontinuity. In current textile element making methods, in order to provide a less breakable machine element than a fully hardened element, the element is tempered after it has been fully hardened; that is, after hardening the part is heated again, but to a lower temperature than in hardening, and cooled more slowly. The element loses some of its hardness and becomes more of a hard spring. However, though a tempered metal is less breakable than a hardened metal, it unfortunately has poorer wear resistance. Thus, a compromise is always arrived at in currently practiced textile element making methods. As much hardness as possible is provided without the danger of breakage. An example is a steel capable of obtaining a full hardness of 68 Rockwell C. While the 68 Rockwell C is its best wear resistance hardness, 61 Rockwell C would be about as hard as the spring characteristics would allow, and 56 to 58 would be better. The parts are too small to allow inserts of a harder material to be used, such as carbide inserts on the wear surfaces of drills and cutters. The parts are too small to be case hardened; and the proper material for case hardening would not give the proper spring characteristics for a textile element. Chrome plate is used extensively but is thin, difficult to control, and of limited wear resistance.

The areas of the textile elements which require the most wear resistance are often small and clearly defined. Examples are the hook of a pile fabric machine knitting needle or the eye of a sewing machine needle, or the spot of a tufting needle. This invention is a new textile element which includes a localized area of hardened material at a predetermined location to provide good wear resistance, with the major portion of the textile element having the proper spring characteristics for a good textile element, these two portions of the element being separated by a buffer zone having less hardness than either the hardened area or the spring tempered major portion. The softer buffer zone is necessary to relieve the stresses and reduce the danger of cracking which occur when there is an abrupt transition from the hard zone to the tempered major body portion without a measurable lower-hardness zone in between.

This invention is also a new method for making a hardened and tempered textile element which has localized small areas of hardened material to provide the greatest wear resistance.

Briefly described, this new method of making a textile element comprises applying high energy heat such as by a laser beam to a selected portion of a member which has previously been hardened and tempered to provide the proper spring characteristic for a textile element. The intensity and time of application of the high energy heat and the area to which it is applied are carefully controlled to provide a small area of hardness completely separated from the tempered portion by a buffer zone of less hardness than either the tempered portion or the small hard area.

The invention as well as its many advantages will be further understood by reference to the following detailed description and drawings in which:

FIG. 1 is a side elevational view showing a portion of a typical latch needle;

FIG. 2 is a side elevational view, on an enlarged scale, showing the new needle formed as a result of applying the new method to a typical latch needle such as shown in FIG. 1;

FIG. 3 is an enlarged sectional view taken along lines 3—3 of FIG. 2;

FIG. 4 illustrates the eye and point of a typical sewing machine needle made by this new method;

FIG. 5 is a schematic representation of the application of a laser beam against the hook of a latch needle in accordance with this invention;

FIG. 6 is a perspective view showing the focusing of a laser beam on the area subject to wear on a tufting needle;

FIG. 7 is an enlarged fragmentary view of the tufting needle of FIG. 6 and illustrating the manner in which the hardened area is formed on the tufting needle; and FIG. 8 is a view, greatly enlarged, showing a hardened area on the tufting needle of FIG. 6 and FIG. 7 and the area immediately around the hardened zone.

In the various Figures, like parts are referred to by like numbers.

Referring to the drawings, and more particularly to FIG. 1, the latch needle includes a blade 10 with a hook 12 on the end of the blade. The latch 14 pivots about pivot 16 which extends transversely across a slot 18 indicated by broken lines. Each time the latch closes, at each knitting stroke, the latch strikes the hook 12.

Referring to FIG. 2 and FIG. 3, the new latch needle includes a small area 20 of full hardness which is located at a predetermined location to provide wear resistance and extending transversely partially into the hook. In the embodiment shown in FIG. 2 and FIG. 3, the location of the small area of full hardness is on the top of the hook 12 which is continuously struck by the latch 14. Typically, the full hardness area 20 may have a Rockwell hardness in the range from 66 to 68 $R_C$. Steels used in textile elements will fully harden into the range of 62 to 70 $R_C$. Each steel composition has its own definite full hardness figure. We mention a hardness range only to include the full hardness values for various steels and not to indicate that any one steel may have a variety of such values.

The hard area 20 is formed by the application of a laser beam or other high energy heat source to raise the temperature of the metal above the critical temperature. The area 20 is very small, such as a spot, compared to the part it is on, so the major portion 12 of the latch needle quenches the spot by removing the heat quickly.

When the laser or other high energy heat source is applied to form the hard spot 20, the hard spot is located on the properly tempered major portion 12 and all should be well, but trouble developes very easily. Some of the hard spots have minute cracks. Possibly all of them have such minute cracks, but it is very difficult to see them with modern instruments. If they do not have cracks, they are still hardened and not tempered, and in no condition to be carrying loads as the needle functions. If they do not have cracks, they very soon will. These cracks propagate, getting larger with each use cycle. The cracks can cross over into the properly tempered major portion 12, which is still quite hard, and keep going until the part fails.

We have found that if a zone such as buffer zone 22 is located between the hard spot and the major portion 12 of the latch needle, the propagation of the cracks in the hard area 20 is stopped. The buffer zone 22 is softer than the material on either side, sometimes as soft as the material can get. The amount of material 22 which is softer than either the hard area 20 or the major portion 12 of the textile element must be carefully controlled. Too much soft material can also spoil the part, as well as no soft material or too little soft material separating the hard area 20 from the major portion 12.

The size of the buffer zone 22 is controlled by (1) the size of the needle, (2) the amount of energy delivered, (3) the time the energy is delivered, and (4) the initial temperature of the needle.

The size of the part for any given needle is a constant. The amount of energy delivered may be varied and it is an important controlling factor; and the time of delivery is very important. Normally, the initial temperature of the needle is room temperature and is not as critical as the amount of energy delivered and the time of delivery of such energy, but can be the deciding factor in some cases.

The buffer zone 22 completely separates the area of full hardness 20 from the major portion of the latch needle. The buffer zone is less hard than either the full hardness area 20 or the major portion of the latch needle. Thus there is a relatively soft area next to the hard spot 20 with the hardness of the buffer zone increasing as you travel away from the hard spot 20 toward the originally hardened and tempered major portion of the latch needle. For example, the needle may include a hard spot with hardness in the range from 66 to 68 $R_c$, the hardness dropping fairly abruptly in the buffer area 22 to possibly 48 to 50 $R_C$ adjacent to the hard spot and gradually rising to the original approximately 56 to 58 $R_C$ in the major area.

In FIG. 4, the new textile element made in accordance with this invention is a sewing machine needle having a major portion 30 with a fully hardened zone at its tip 32, and fully hardened zones 34 and 36 adjacent the eye 38 of the sewing machine needle. Fully hardened zones 34 and 36 extend transversely partially into the needle. The tip 32 of the needle is completely separated from the major portion 30 of the sewing machine needle by the buffer zone 40. The major portion of the needle 30 is also separated from the fully hardened zones 34 and 36 by buffer zones 39 and 41, respectively.

The fully hardened zone or tip 32 and the buffer zone 40 are located on the point of the sewing machine needle. The point is defined as that part of the needle between the eye 38 and the end of the tip 32. The length of most sewing machine needle points ranges from 1.0 millimeters to 10.0 millimeters. Thus, depending on the size of the sewing machine needle and the portion of the point it is desired to harden, the hardened tip 32 and its buffer zone 40 will generally range from 0.3 millimeters to one-half the length of the point.

Typically, the full hardened areas may have a Rockwell hardness of approximately 68 $R_C$ with the buffer zones having a minimum hardness of approximately 45 $R_C$ immediately adjacent the hardened areas and with the buffer zone hardness gradually increasing to the Rockwell hardness of approximately 60 $R_C$ of the major portion at the boundaries of the buffer zones with the major portion 30.

In practicing this new method of making a textile element such as the latch needle shown in FIG. 2 and FIG. 3, or the sewing machine needle of FIG. 4, high energy heat is applied to the selected portion of the member for a very short period of time, and then cut off, and the spot cools. A pulsed laser is preferably used. The needle has been previously hardened and tempered to provide the proper spring characteristic for a needle. This new method provides a new needle which provides fully hardened wear spots on the tempered needles to increase the wear life while not decreasing the fatigue life.

High energy heat such as from a pulsed laser light beam is applied to the hook 12 of a latch needle which has been previously hardened and tempered to provide the proper spring characteristic. The high energy heat raises the temperature of a small area to above the critical temperature. When the laser is cut off after only a few milliseconds of time, the heated area cools. The spot becomes full hard, while the very adjacent area is over-tempered or possibly even annealed to produce a much softer buffer zone which increases in hardness away from the hard spot up to the tempered hardness of the major portion of the needle. The intensity and time of application of the laser beam, and the area of application on the textile element must be very carefully controlled. For example, with a typical latch needle made of steel, to reharden the desired spot 20, we heat the spot to a minimum of 1330° F., with 1500° to 1600° F. being optimum. From that temperature we must cool past 1000° F. in less than one second to retain the hard spot and not temper it, as can be seen from the Time-Temperature-Transformation curves for steel. If the spot is heated too rapidly, there is a very abrupt steep temperature gradient from the heated spot temperature to the relatively cold temperature of the needle body. With this temperature gradient, when the laser is cut off the heat transfers into the body 12 so fast that the buffer zone 22 is much too narrow to be measurable with present metallurgical instruments and so is not really a buffer zone at all, and the resulting latch needle will crack and break quickly in use.

To obtain the desired serviceable buffer zone 22, it is desirable to heat the buffer zone to a less-abrupt predetermined temperature gradient to produce higher temperatures in the buffer area, and to reduce the cooling speed or the rate of heat transfer from the buffer zone 22. The longer time it takes to cool from the predetermined temperature, the softer will be the buffer zone. The thicker the heated buffer area, the thicker will be the resulting buffer zone. Therefore, we deliberately control the intensity and time of application of the laser beam, so that the time of application is longer than required merely for a rapid heating to form the hard area 20. The time of heating is increased over that necessary to form only the hard spot 20, but is still measured in milliseconds. This increased time is controlled to form a proper sized buffer zone. The temperature of the buffer zone 22 goes higher than with more rapid heating because there is more time for heat flow to that buffer area from the hot spot 20. The temperature gradient in the buffer zone 22 from the hot spot 20 to the tempered body area 12 will be less steep. Thus, when the laser is cut off it takes slightly longer for the temperature to reduce down to the temperature of the needle body. The temperature of the spot 20 must still be reduced down past 1000° F. in less than one second to make it harden fully, but the temperature in the area next to it, because of the relatively flatter temperature gradient and the thicker buffer zone, will not reduce as quickly as when there had been an extremely thin buffer area due to the fast spot heating. That area of the needle which has had the highest temperatures beneath the temperatures at which the needle will harden will end up the softest and thus a relatively soft area or buffer zone 22, next to the hard spot 20, is provided, with the hardness within the buffer zone 22 increasing as you travel from the hard spot 20 toward the originally hardened and tempered body area 12. Thus we will have our hard spot around 66 to 68 Rockwell C; the hardness dropping fairly abruptly in the buffer zone 22 to possibly 48 to 50 Rockwell C and gradually rising to the original approximately 56 to 58 Rockwell C in the body area 12.

Normally, the needle will be at room temperature before the application of the laser beam. If the width of the heated buffer area is too small and the rate of cooling in this process is still too fast for our desired buffer zone 22 when the needle spot is heated from room temperature, then we can initially raise the needle body temperature before laser-heating the spot. This will extend the time it takes after turning off the laser to reduce the temperature of our desired buffer zone 22, resulting in the desired wider less hard zone. The hardened spot having been heated up to a hardening temperature, will still come out hard so long as we reduce this temperature down to 1000° F. in less than one second.

If the buffer zone is too big after laster-heating the spot on a needle at room temperature, the needle can be pre-cooled, thereby reducing the buffer zone.

Of course, the exact time allowable for heating and for cooling, the exact heating temperature, and the intensity required will actually depend upon the alloy of the textile element material, the textile element size, and the exact end results desired on any particular textile element. The hard spots typically may be in the range of 0.002 inch to 0.015 inch thick, and the buffer zone typically may have a thickness in the range from one quarter the thickness of the hard spot to a thickness equal to that of the hard spot. On the hook wear area of a machine knitting needle with a hook wire diameter of 0.012 inch, typically the thickest part of the hard zone 20 may be approximately 0.004 inches; and the buffer zone 22 between the hard spot 20 and the previously tempered needle body 12 may be approximately 0.003 inch thick.

FIG. 5 is a schematic representation showing a laser beam system for practicing this new method. Referring to FIG. 5, the laser 50 emits a laser beam 52. The laser beam 52 may be too large because of the small size of the textile element. Thus the beam is next run through a particularly shaped aperture or hole 54 in a metal plate or mask or shield such as a polished brass plate 56. The reduced beam 58 does not have enough concentration to reach the temperatures required. Thus, the reduced beam 58 is conducted through a lens 60 to concentrate the beam on the area to be heated. The excess light which strikes the plate 56 is reflected back and preferably scattered by having a nonflat surface on plate 56 so as not to damage the laser equipment.

As discussed above, this new method requires an extremely accurate control of temperatures applied to form the hard spot. Either just before or just after the focal point 62, the concentration of light energy, and thus heat energy, is not as intense as it is at the focal point. We have found that we can partially control temperature by varying the distance of the workpiece 12 from the focal point 62. Other controls consist of varying the laser output, varying the time length of energy application, changing the light concentration lens, varying the size and shape of the aperture in the light mask or shield. The shape of the aperture also gives us good control over the area of heating and lets us prevent heating of other areas which should remain relatively cool.

In FIG. 6, a tufting needle 70 is shown including a shank 72, a blade 74, a spot area 76, an eye 78, and a tip 80.

The laser beam 82 is focused on the spot 76 of the tufting needle 70 by means of a convex lens 84.

A tuftig needle is used in the manufacturing of carpets which have a very heavy yarn, which is "tufted" through a woven carpet backing. In order to create a "loop pile", a device known as a looper moves in to hook into the yarn and hold it in place as the tufting needle is withdrawn up and out of the carpet backing.

To insure that the looper will, in fact, pick up the yarn, the machinery is usually adjusted so that the looper will make contact with the needle at the spot 76 area as the looper moves into position across the needle. This adjustment is not a precise adjustment, and there can be as much as a 1/16th of an inch interference between the two parts. Everything springs aside to allow passes of the looper pass the tufting needle and the action proceeds this way again and again and again as the carpet is made. The part that suffers is the tufting needle and a very severe wear developes across the contact or spot area. Wear is often 1/32nd of an inch deep into the needle and in some cases as deep as 1/16th of an inch. This renders the needle useless, the yarn starts to fray and split, the sharp edges created from wear action start to cut the carpet backing and the whole process must be stopped.

The solution to the problem is to leave the major portion of the tufting needle in its original hardened and tempered condition, which provided the proper spring characteristic hardness of say, $R_c$ 55–58 for use as a tufting needle. This gives the shaft of the needle excellent strength and toughness so it will not break under deflection. The major portion is then selectively hardened only in the wear area. The wear area is hardened up to say, a hardness of $R_C$ 65–67.

The hardened areas are formed by using the energy from a laser beam focused through the focusing lens 84 and irradiating the needle 70 with the focused energy. A continuous laser beam is preferred to form the hardened areas on the tufting needle. With the use of a continuous laser beam, the needle 70 is moved underneath the beam, such as in the direction of the arrow 86 shown in FIG. 7. Thus, when the beam is on you can effectively radiate a path or stripe 88. Because the area 76 or spot of the needle where the wear occurs is so large, a plurality of stripes 88 may be put on. The exact number of stripes depends on the size of the needle and the size of the wear area. As few as one, and as many as you want can be put on the needle. Each stripe 88 will be similar to each other, and each one will have the hardness value of, say, $R_c$ 65–67. Each stripe 88 extends transversely only partially into the needle (see FIG. 8). The stripes may run along the needle at any one or a variety of angles to the needle axis. We prefer stripes perpendicular to the axis. It is also practical to form a wider area hard spot by utilizing closely adjoining stripes or intersecting stripes which run in two or more directions, or one or more stripes running in irregular paths.

When the laser beam is focused on a relatively small area or volume, as compared to the overall size of the total volume, this small area absorbs the energy from the beam rapidly. This absorption of energy is done in terms of 1/1000th of a second. The energy absorbed is transformed into heat energy and the small area is heated to a very high temperature in the area of 1400° F. to 1600° F. Yet, the surrounding area of the part is unaffected because the time duration has been so short there has been no time for any heat transfer into the surrounding area.

The laser beam is now removed from the small volume, either by being shut off or by moving along its path of travel to another area. As soon as the beam is taken away, energy starts to flow away from the hardened area through the physical laws of heat transfer to the unaffected larger mass of material. The heat leaves at a very rapid rate because of two things: the very large temperature differential; and the very large difference between the two volumes, the larger volume "pulling" the heat out very rapidly.

As in the case of the other embodiments described above, the amount of energy delivered and the time the energy is delivered is controlled to provide the appropriately sized buffer zone 90 shown in FIG. 8. The size of the tufting needle is a factor in how long and how much energy is to be applied, but is a constant for a given size of tufting needle required. Also, as in the case of the other embodiments discussed above, if the resulting buffer zone 90 is too small or too large, rather than applying a laser beam to a tufting needle at room temperature, the tufting needle may be pre-heated or pre-cooled, respectively.

In the case of a tufting needle with a plurality of stripes 88 spaced close together, it may be necessary to do each stripe 88 a considerable time after the previous one to allow the needle time to cool. To increase productivity we may, for example, do one hundred needles at a setting. Each needle gets one stripe 88, and then has to wait for all the others. By the time the second stripe is added, the part is back to an acceptable temperature.

Sometimes it is desirable not to have the hard spot at its maximum possible hardness, but to have it tempered to a lesser hardness which is still harder than the spring tempered hardness of the major portion of the textile element, while still maintaining the overtempered softer buffer zone between the hard spot and the major portion. In this case, after the element has been hardened and tempered, and after the fully hardened area and the softer buffer zone have been formed, the full hard spot is tempered to a lesser hardness which is still harder than the major portion. The heating for this tempering may be accomplished by spot heating in a manner similar to heating for the spot hardening only to a much lesser extent, or by localized heating as by induction heating, or by heating the entire element, or by any other desired heating method, and then cooling. This tempering temperature is too low to change the hardness of any of the already tempered sections of the element.

While we have referred specifically to machine needles in discussing textile elements, the process and products are not limited to needles. Other textile items, such as for example, jacks, sinkers, dividers, awls, sliders, hooks, guides, and punches also must be included in this general category.

We claim:

1. A tufting needle comprising: a major portion having proper predetermined hardened and tempered spring characteristics for a tufting needle to provide long fatigue life; a plurality of hard stripes and a corresponding buffer zone for each stripe formed by the controlled application of a laser beam, beams, the hard stripes being harder than the major portion, and located at a predetermined location which is subject to more wear then the remainder of the tufting needle to provide good wear resistance, each buffer zone being of less hardness than either the hard area or the major portion and completely separating each corresponding hard stripe from the major portion.

* * * * *